US012727698B1

(12) United States Patent
Radhs

(10) Patent No.: US 12,727,698 B1
(45) Date of Patent: Sep. 8, 2026

(54) CHRISTMAS-THEMED DECORATION FOR USE WITH A TREE

(71) Applicant: Michael Radhs, Eutawville, SC (US)

(72) Inventor: Michael Radhs, Eutawville, SC (US)

( * ) Notice: Subject to any disclaimer, the term of this patent is extended or adjusted under 35 U.S.C. 154(b) by 0 days.

(21) Appl. No.: 19/247,641

(22) Filed: Jun. 24, 2025

(51) Int. Cl.
*A47G 33/08* (2006.01)
*F21S 4/15* (2016.01)

(52) U.S. Cl.
CPC ................ *A47G 33/08* (2013.01); *F21S 4/15* (2016.01); *A47G 2033/0827* (2013.01)

(58) Field of Classification Search
CPC ........................ A47G 33/08; A47G 2033/0827
USPC .......................................................... 362/225
See application file for complete search history.

(56) References Cited

U.S. PATENT DOCUMENTS 4,462,065 A * 7/1984 Rhodes ..................... F21S 4/10 362/396
5,408,782 A 4/1995 Mcconnell
6,363,644 B1 4/2002 Frost
6,395,369 B1 * 5/2002 Randone ................. G09F 17/00 362/267
8,084,115 B2 12/2011 Lanzi
D720,192 S 12/2014 Hayman
10,641,470 B1 * 5/2020 Smyth ................ F21V 21/0816
10,977,967 B1 4/2021 Ekroth
2008/0010881 A1 1/2008 Penza
2009/0139441 A1 6/2009 Barone
2014/0215874 A1 8/2014 Bashore
2015/0228210 A1 8/2015 Miller
2016/0104399 A1 4/2016 Gottschalk

FOREIGN PATENT DOCUMENTS

WO 2017024157 2/2017

* cited by examiner

*Primary Examiner* — Toan C Ly
(74) *Attorney, Agent, or Firm* — Kyle A. Fletcher, Esq.

(57) ABSTRACT

The Christmas-themed decoration for use with a tree is a decorative structure. The Christmas-themed decoration for use with a tree is configured for use with a tree. The Christmas-themed decoration for use with a tree binds to the trunk of the tree. The Christmas-themed decoration for use with a tree displays an image from the trunk that is visible from the environment. The Christmas-themed decoration for use with a tree incorporates a superior sheeting panel, an inferior sheeting panel, a fastening device, and a plurality of rigging structures. The superior sheeting panel attaches to the inferior sheeting panel. The fastening device attaches to the inferior sheeting panel. The plurality of rigging structures attach to the superior sheeting panel. The fastening device secures the inferior sheeting panel to the trunk of the tree. The plurality of rigging structures attach the superior sheeting panel to the trunk of the tree.

20 Claims, 6 Drawing Sheets

CHRISTMAS-THEMED DECORATION FOR USE WITH A TREE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Not Applicable

SUMMARY OF INVENTION

The Christmas-themed decoration for use with a tree is a decorative structure. The Christmas-themed decoration for use with a tree is configured for use with a tree. The Christmas-themed decoration for use with a tree binds to the trunk of the tree. The Christmas-themed decoration for use with a tree displays an image from the trunk that is visible from the environment. The Christmas-themed decoration for use with a tree comprises a superior sheeting panel, an inferior sheeting panel, a fastening device, and a plurality of rigging structures. The superior sheeting panel attaches to the inferior sheeting panel. The fastening device attaches to the inferior sheeting panel. The plurality of rigging structures attach to the superior sheeting panel. The fastening device secures the inferior sheeting panel to the trunk of the tree. The plurality of rigging structures attach the superior sheeting panel to the trunk of the tree.

These together with additional objects, features and advantages of the Christmas-themed decoration for use with a tree will be readily apparent to those of ordinary skill in the art upon reading the following detailed description of the presently preferred, but nonetheless illustrative, embodiments when taken in conjunction with the accompanying drawings.

In this respect, before explaining the current embodiments of the Christmas-themed decoration for use with a tree in detail, it is to be understood that the Christmas-themed decoration for use with a tree is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the Christmas-themed decoration for use with a tree.

It is therefore important that the claims be regarded as including such equivalent construction insofar as they do not depart from the spirit and scope of the Christmas-themed decoration for use with a tree. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
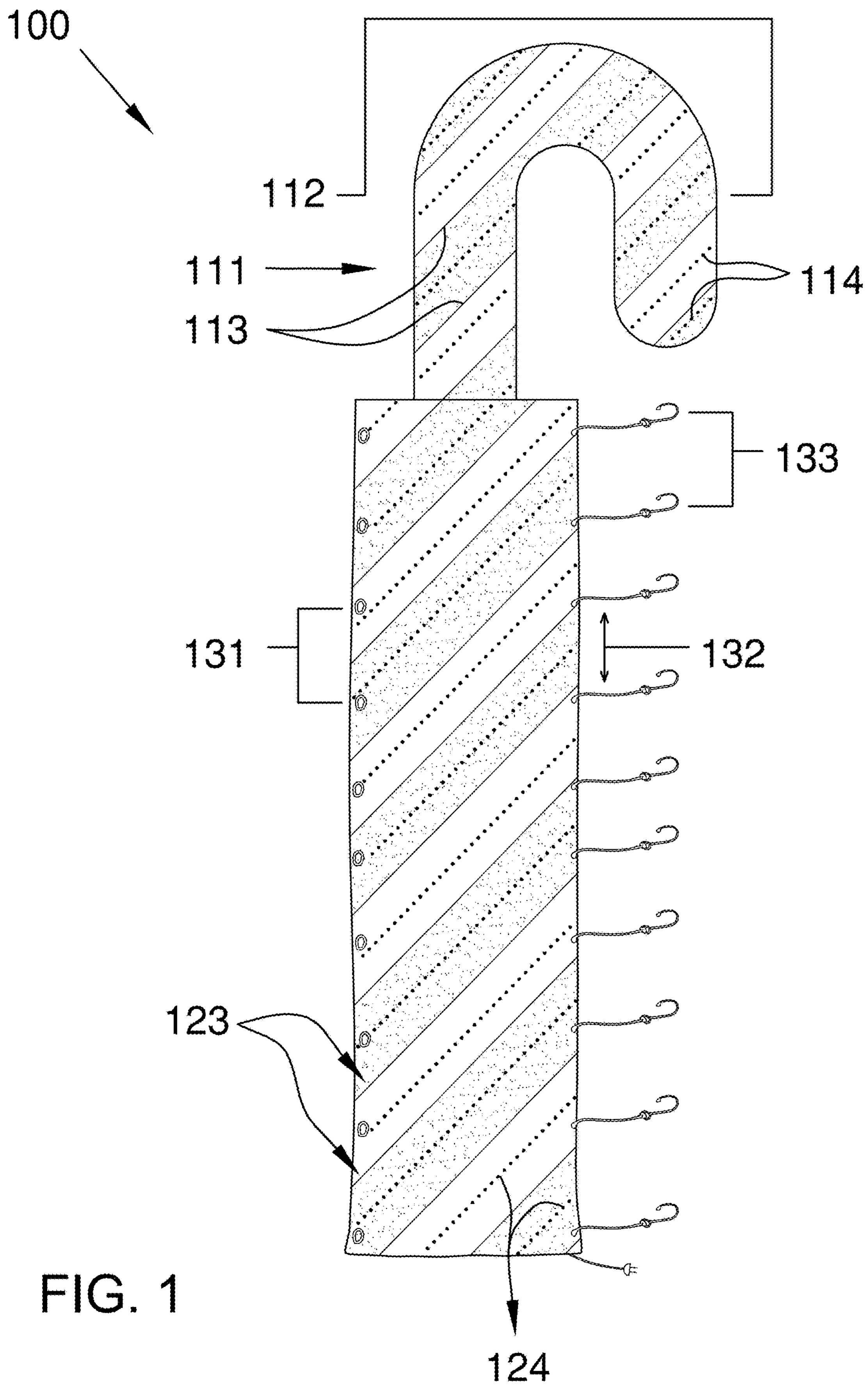
FIG. 1 is an anterior view of an embodiment of the disclosure.
Figure 2:
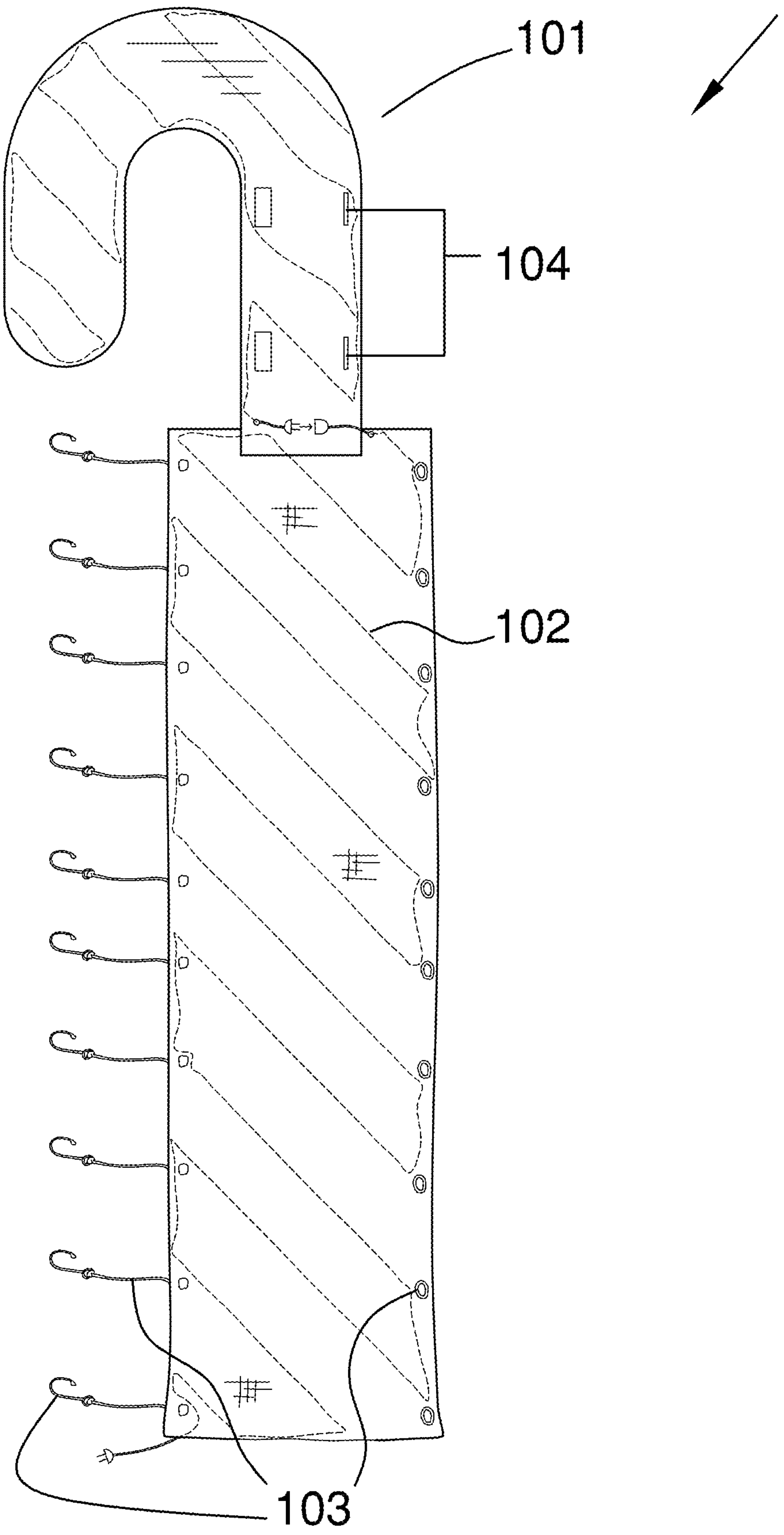
FIG. 2 is a rear view of an embodiment of the disclosure.
Figure 3:
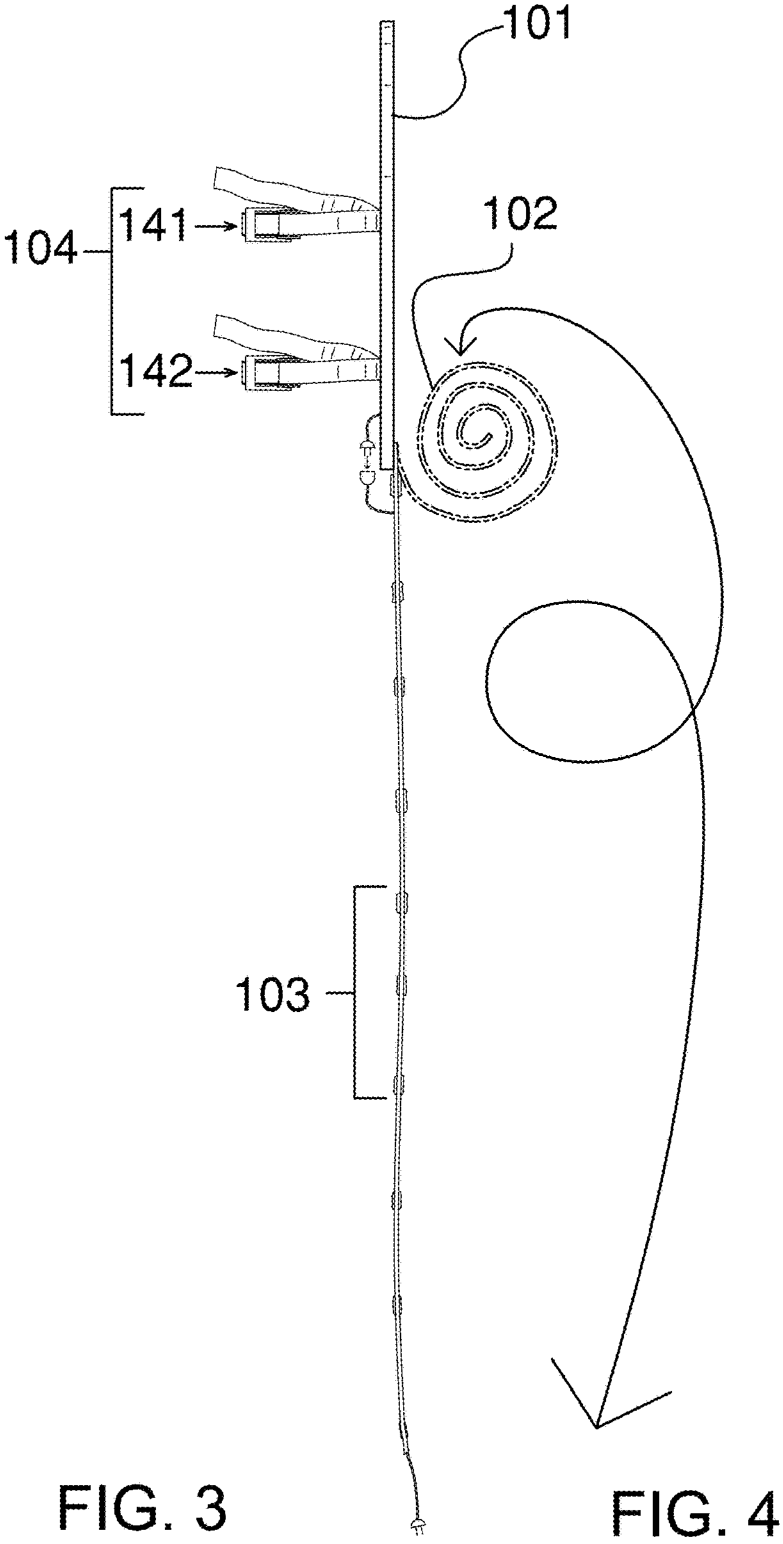
FIG. 3 is a right side view of an embodiment of the disclosure.
Figure 4:
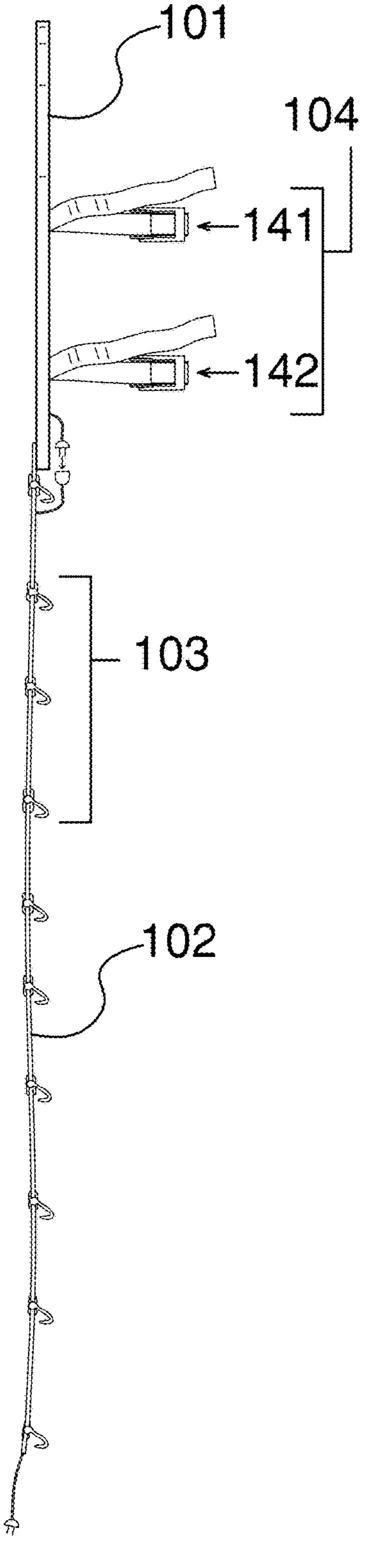
FIG. 4 is a left side lateral view of an embodiment of the disclosure.
Figure 5:
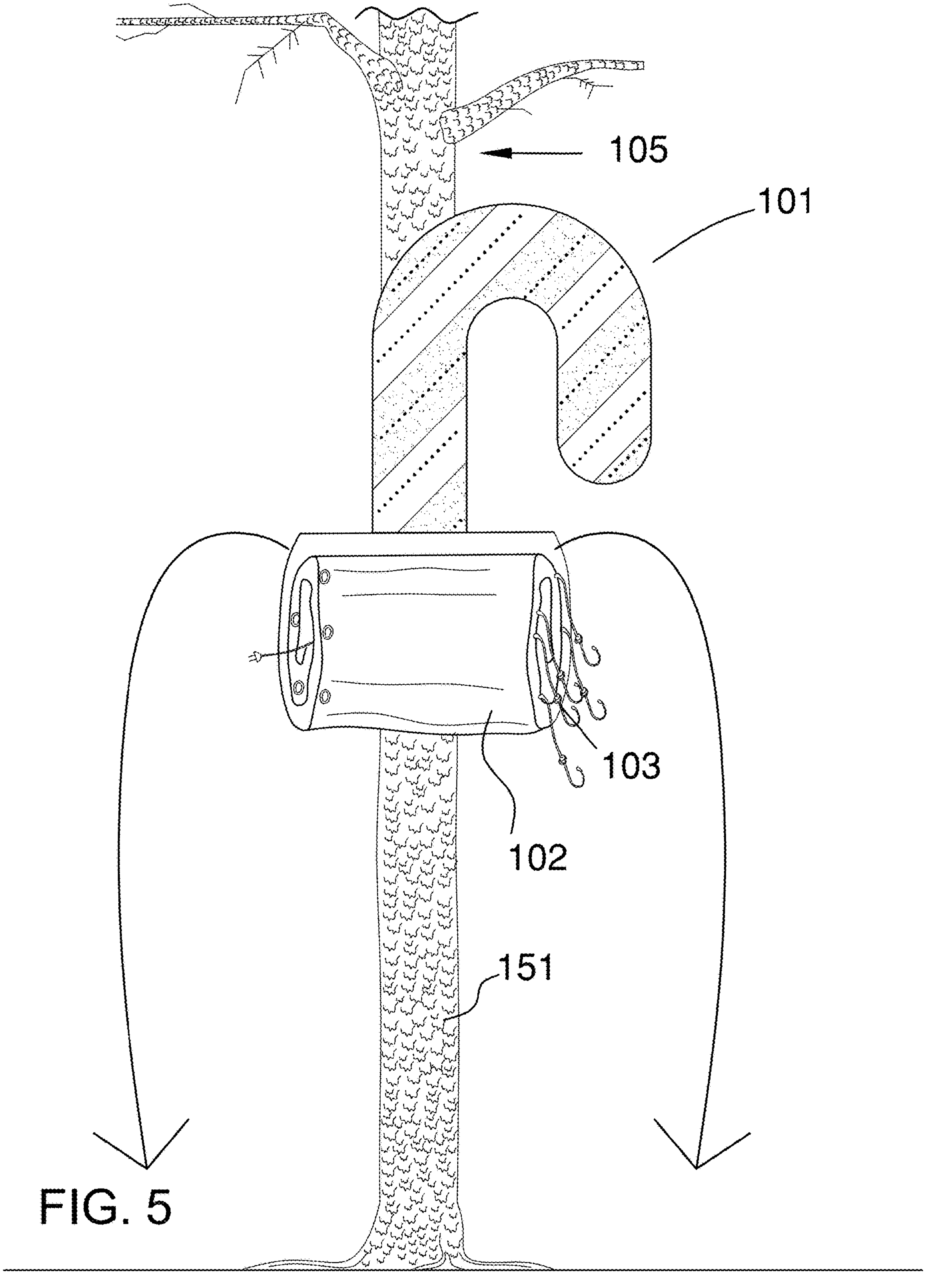
FIG. 5 is an anterior in-use view of an embodiment of the disclosure.
Figure 6:
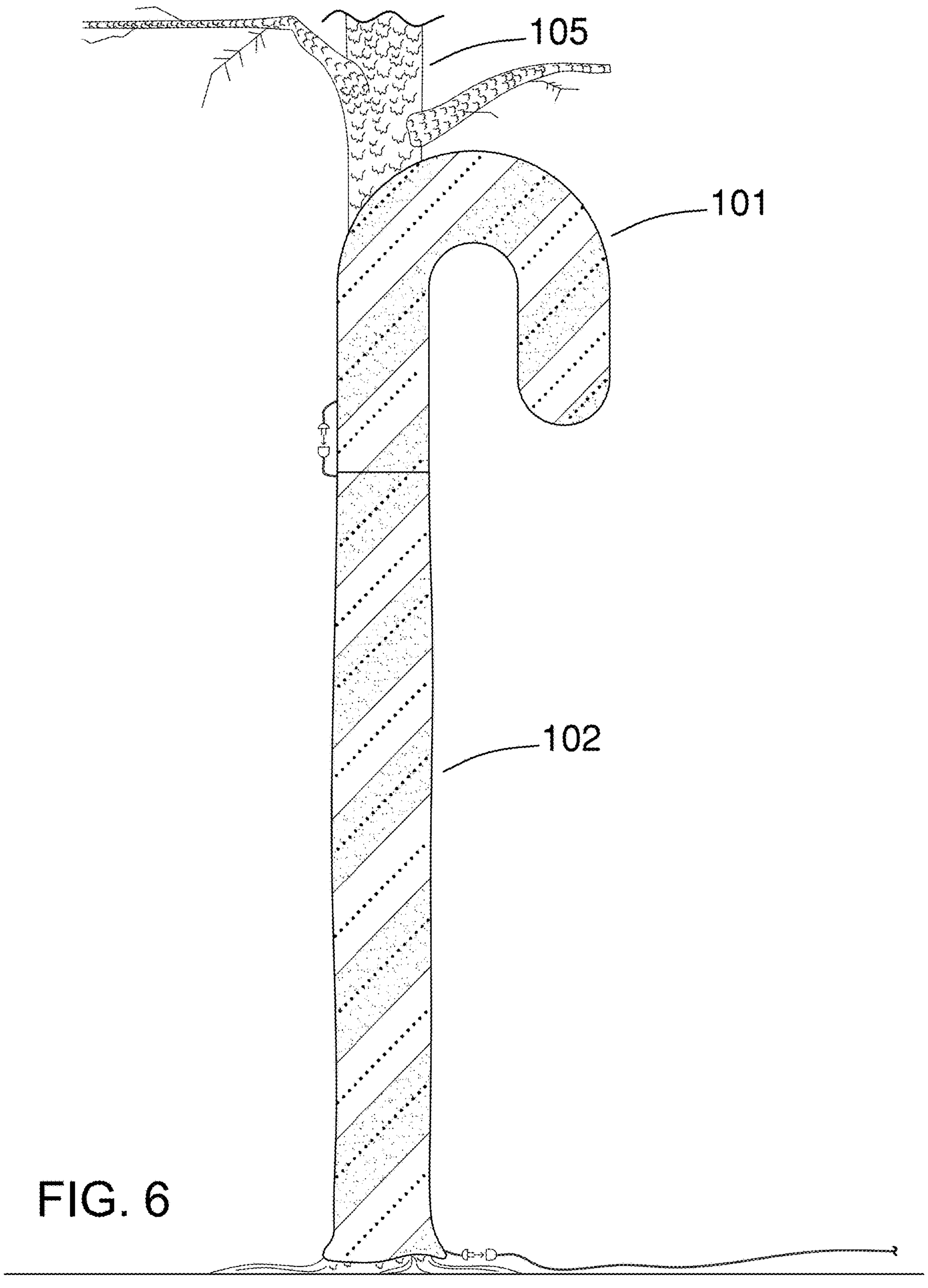
FIG. 6 is an anterior in-use view of an embodiment of the disclosure.
Figure 7:
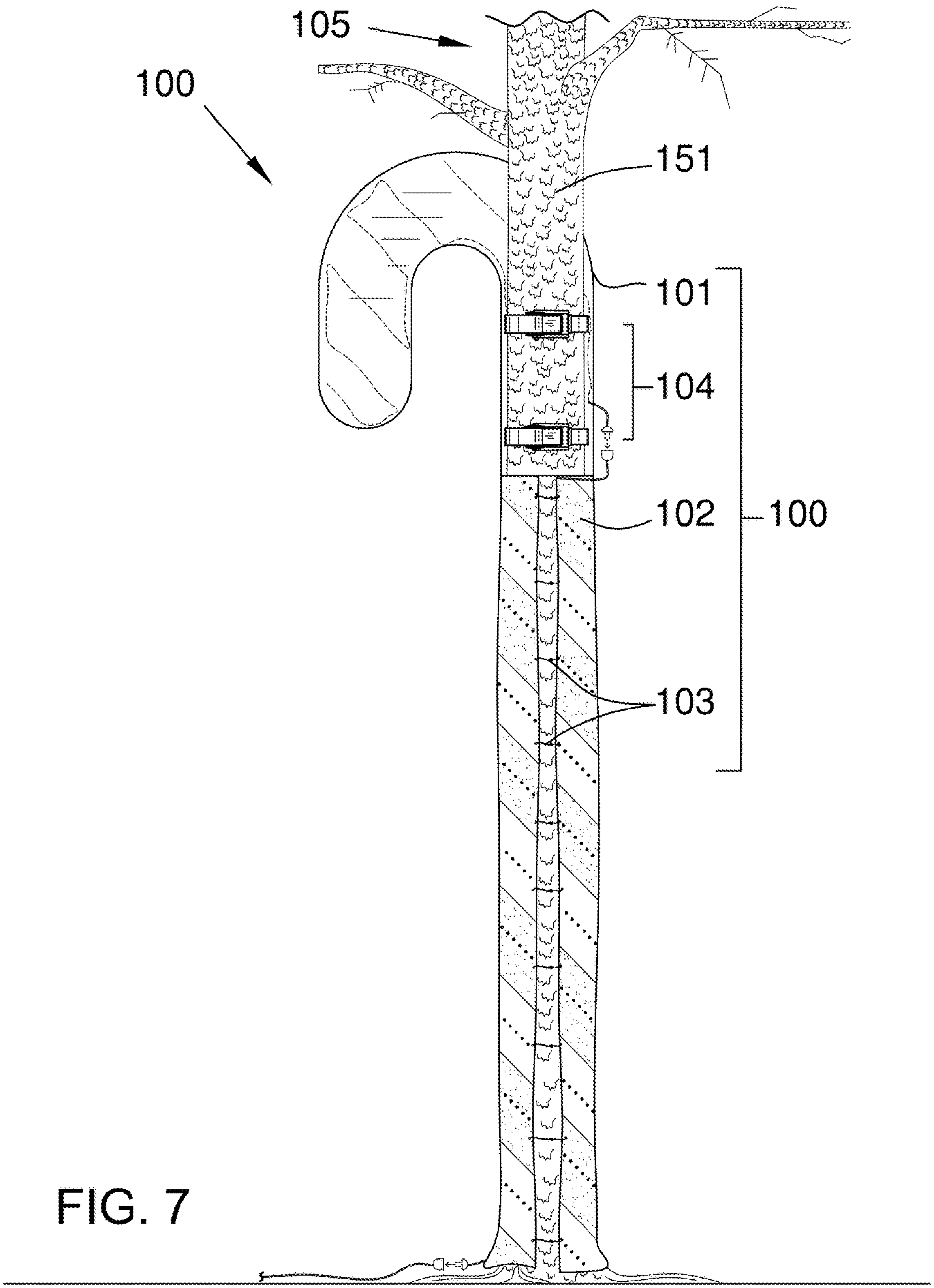
FIG. 7 is a posterior in-use view of an embodiment of the disclosure.

Detailed reference will now be made to one or more potential embodiments of the disclosure, which are illustrated in FIGS. 1 through 7.

The Christmas-themed decoration for use with a tree 100 (hereinafter invention) is a decorative structure. The invention 100 is configured for use with a tree 105. The invention 100 binds to the trunk 151 of the tree 105. The invention 100 displays an image from the trunk 151 that is visible from the environment. The invention 100 comprises a superior sheeting panel 101, an inferior sheeting panel 102, a fastening device 103, and a plurality of rigging structures 104. The superior sheeting panel 101 attaches to the inferior sheeting panel 102. The fastening device 103 attaches to the inferior sheeting panel 102. The plurality of rigging structures 104 attach to the superior sheeting panel 101. The fastening device 103 secures the inferior sheeting panel 102 to the trunk 151 of the tree 105. The plurality of rigging structures 104 attach the superior sheeting panel 101 to the trunk 151 of the tree 105.

The tree 105 is a tree. It shall be noted that the invention 100 may be used with another stanchion structure, and the intent of this patent is not to be limited to a particular stanchion structure. Other stanchion structures may include light poles, telephone poles, or other tall/thin objects. The tree 105 forms a stanchion structure to which the invention 100 attaches. The tree 105 forms a trunk 151. The invention 100 is bound to the trunk 151 of the tree 105. The image formed by the invention 100 is visible from the trunk 151 of the tree 105. The tree 105 displays an illumination that is generated from the inferior sheeting panel 102 and the superior sheeting panel 101.

The inferior sheeting panel 102 is a sheeting structure. The inferior sheeting panel 102 is a textile based structure. The inferior sheeting panel 102 forms the superior structure of the image displayed by the invention 100. The inferior sheeting panel 102 is an illuminated structure. The inferior sheeting panel 102 generates an illumination that is visible from the environment. The textile structure of the inferior sheeting panel 102 allows the inferior sheeting panel 102 to be rolled into a scroll structure for storage. The form factor of the inferior sheeting panel 102 presents a rectangular shape. The form factor of the inferior sheeting panel 102 presents indicia that are intended to generate the sentiment of the cylinder shape of a candy cane when viewed.

The inferior sheeting panel 102 comprises an inferior image 123 and an inferior light string structure 124.

The inferior image 123 is an image that is formed on the anterior face of the inferior sheeting panel 102. The inferior image 123 forms the balance of the image displayed by the invention 100. The anterior face of the inferior sheeting panel 102 is the face of the inferior sheeting panel 102 that is distal from the trunk 151 of the tree 105. The posterior face of the inferior sheeting panel 102 is the face of the inferior sheeting panel 102 that is distal from the inferior image 123. The posterior face of the inferior sheeting panel 102 is proximal to the trunk 151 of the tree 105. The inferior image 123 presents indicia that are intended to generate the sentiment of the stripes traditionally displayed on a candy cane.

The inferior light string structure 124 is a light string. The inferior light string structure 124 mounts on the anterior face of the superior sheeting panel 101. The inferior light string structure 124 is an electric device that converts electric energy into an illumination. The illumination generated by the inferior light string structure 124 illuminates the inferior image 123 such that the inferior image 123 is visible from the environment during darkness. The inferior light string structure 124 draws electric energy from an externally provided source of electric energy.

The superior sheeting panel 101 is a sheeting structure. The superior sheeting panel 101 is a textile based structure. The superior sheeting panel 101 forms the superior structure of the image displayed by the invention 100. The superior sheeting panel 101 is an illuminated structure. The superior sheeting panel 101 generates an illumination that is visible from the environment. The superior sheeting panel 101 forms a u-shaped structure. The form factor of the superior sheeting panel 101 presents an illiterate u-shape. The form factor of the superior sheeting panel 101 presents indicia that are intended to generate the sentiment of the hook of a candy cane when viewed.

The superior sheeting panel 101 comprises a first arm structure 111, a second arm structure 112, a superior image 113, and a superior light string structure 114.

The superior sheeting panel 101 permanently attaches to the inferior sheeting panel 102. A seam joins the inferior sheeting panel 102 to the free end of the first arm structure 111 of the superior sheeting panel 101. The first arm structure 111 attaches to a perimeter edge of the inferior sheeting panel 102 that is parallel to the minor axis of the inferior sheeting panel 102. The first arm structure 111 attaches to the perimeter edge of the inferior sheeting panel 102 that positions the superior sheeting panel 101 as the superior structure of the invention 100. The first arm structure 111 attaches to the perimeter edge of the inferior sheeting panel 102 such that the center of the first arm structure 111 aligns with the major axis of the inferior sheeting panel 102.

The first arm structure 111 forms a portion of the u-shaped sheeting structure of the superior sheeting panel 101. The first arm structure 111 forms a first arm of the u-shaped structure of the superior sheeting panel 101. The first arm structure 111 attaches to the inferior sheeting panel 102. The span of the length of the first arm structure 111 is greater than the span of the length of the second arm structure 112. The first arm structure 111 presents indicia that are intended to generate the sentiment that the first arm structure 111 is an extension of the cylinder of the candy cane.

The second arm structure 112 forms a portion of the u-shaped sheeting structure of the superior sheeting panel 101. The second arm structure 112 forms a first arm of the u-shaped structure of the superior sheeting panel 101. The second arm structure 112 presents indicia that are intended to generate the sentiment that the second arm structure 112 that forms the capture end of the hook structure of the candy cane. The second arm structure 112 forms the free end of the superior sheeting panel 101.

The superior image 113 is an image that is formed on the anterior face of the superior sheeting panel 101. The superior image 113 forms a portion of the image displayed by the invention 100. The anterior face of the superior sheeting panel is the face of the superior sheeting panel 101 that is distal from the trunk 151 of the tree 105. The posterior face of the superior sheeting panel 101 is the face of the superior sheeting panel 101 that is distal from the superior image 113. The posterior face of the superior sheeting panel 101 is proximal to the trunk 151 of the tree 105. The superior image presents indicia that are intended to generate the sentiment of the stripes traditionally displayed on a candy cane.

The superior light string structure 114 is a light string. The superior light string structure 114 mounts on the anterior face of the superior sheeting panel 101. The superior light string structure 114 is an electric device that converts electric energy into an illumination. The illumination generated by the superior light string structure 114 illuminates the superior image 113 such that the superior image 113 is visible from the environment during darkness. The superior light string structure 114 draws electric energy from the inferior light string structure 124 of the inferior sheeting panel 102.

The fastening device 103 is a mechanical structure. The fastening device 103 is an elastic structure. The fastening device 103 attaches the perimeter edges of the inferior sheeting panel 102 that are parallel to the major axis of the inferior sheeting panel 102. The fastening device 103 binds the inferior sheeting panel 102 to the trunk 151 of the tree 105 with a tight fit. The fastening device 103 comprises a plurality of grommet structures 131, a plurality of elastic cords 132, and a plurality of hook structures 133.

The plurality of grommet structures 131 comprises a collection of grommet structures. The plurality of elastic cords 132 comprises a collection of elastic cords. The plurality of hook structures 133 comprises a collection of hook structures. There is a one to one correspondence between the plurality of hook structures 133 and the plurality of grommet structures 131. There is a one to one correspondence between the plurality of hook structures 133 and the plurality of elastic cords 132.

Each elastic cord selected from the plurality of elastic cords 132 is an elastic cord. The fixed end of each elastic cord selected from the plurality of elastic cords 132 attaches to a perimeter edge selected from the group consisting of: a) left side perimeter edge that is parallel to the major axis of the inferior sheeting panel 102; and, b) right side perimeter edge that is parallel to the major axis of the inferior sheeting panel 102. Each selected elastic cord is deformed as the fastening device 103 attaches the inferior sheeting panel 102 to the trunk 151 of the tree 105. Each selected elastic cord provides a portion of the tension that secures the inferior sheeting panel 102 to the trunk 151 of the tree 105 with a tight fit.

Each hook structure selected from the plurality of hook structures 133 is a hook. Each selected hook structure permanently attaches to the free end of its associated elastic cord selected from the plurality of elastic cords 132. Each selected hook structure detachable secures the free end of the associated selected elastic cord to its associated grommet structure selected from the plurality of grommet structures 131. The selected elastic cord deformed as the selected hook structure secures its associated selected elastic cord to its associated selected grommet structure.

The plurality of grommet structures 131 are formed at the perimeter edge of the inferior sheeting panel 102 that was not selected for the plurality of hook structures 133. Each grommet structure selected from the plurality of grommet structures 131 is a grommet. Each selected grommet structure form an anchor point the anchors its associated selected hook structure to the inferior sheeting panel 102.

Each rigging structure selected from the plurality of rigging structures 104 is a mechanical structure. Each selected rigging structure is a fastening device. Each selected rigging structure attaches to the posterior face of the superior sheeting panel 101. Each selected rigging structure binds the superior sheeting panel 101 to the trunk 151 of the tree 105 with a tight fit. The plurality of rigging structures 104 comprises a first rigging structure 141 and a second rigging structure 142.

The first rigging structure 141 is a rigging. The first rigging structure 141 is a webbing based structure. The first rigging structure 141 attaches to the posterior face of the superior sheeting panel 101. The first rigging structure 141 binds the superior sheeting panel 101 to the trunk 151 of the tree 105. In the first potential embodiment of the disclosure the first rigging structure 141 is a ratcheted ring and slider arrangement.

The second rigging structure 142 is a rigging. The second rigging structure 142 is a webbing based structure. The second rigging structure 142 attaches to the posterior face of the superior sheeting panel 101. The second rigging structure 142 binds the superior sheeting panel 101 to the trunk 151 of the tree 105. In the first potential embodiment of the disclosure the second rigging structure 142 is a ratcheted ring and slider arrangement.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Anterior: As used in this disclosure, anterior is a term that is used to refer to the front side or direction of a structure. When comparing two objects, the anterior object is the object that is closer to the front of the structure.

Associate: As used in this disclosure, the term associate is used to describe a relationship between a first object and a second object. The use of the term associated implies both: a) that the first object works with the second object in order to accomplish a task necessary for the implementation of the invention (such as joining two objects together); and, b) the relationship remains stable through the accomplishment of the task. By stable is meant that neither the first object or the second object are intended to be interchanged with a third object during the use of the invention.

Bind: As used in this disclosure, to bind is a verb that means to tie or secure a first object to a second object using a strap, cord, or webbing. Bind can also mean to tie or secure a plurality of similar first objects together by wrapping a second object around the plurality of similar first objects.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Material: As used in this disclosure, a composite material is a multilayer structure made of two or more joined layers of sheeting materials and coatings.

Composite Prism: As used in this disclosure, a composite prism refers to a structure that is formed from a plurality of structures selected from the group consisting of a prism structure, a pyramid structure, and a spherical structure. The plurality of selected structures may or may not be truncated or bifurcated. The plurality of prism structures are joined together such that the center axes of each of the plurality of structures are aligned. The congruent ends of any two structures selected from the group consisting of a prism structure and a pyramid structure need not be geometrically similar.

Composite Textile: As used in this disclosure, a composite textile is a multilayer fabric made of two or more joined layers of textile or sheeting materials.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, yarn, and rope are synonyms for cord. This definition further includes textile webbings as a type of cord. The free end of a cord refers to the region of the cord that is proximal to the congruent end of the prism shape of the cord. A fixed end of a cord refers to a free end of a cord that has been bound to an anchor point.

Correspond: As used in this disclosure, the term correspond is used as a comparison between two or more objects wherein one or more properties shared by the two or more objects match, agree, or align within acceptable manufacturing tolerances.

Decorative: As used in this disclosure, decorative is an adjective that refers to a first object or item that is used with a second object or item for the purpose of making the second object or item more interesting or attractive. Decorative will generally, but not necessarily, imply making the second object or item more visually attractive.

Deformation: As used in this disclosure, the term deformation refers to the application of a force to an object such that the form factor of the object is changed. The infinitive form of deformation is "to deform." An object can be elastically deformed and inelastically deformed. The elastically deformed object will return to its original shape (the relaxed shape) when the deforming force is removed. The inelastically deformed object will not return to its original shape when the deforming force is removed.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Effective Length: As used in this disclosure, the effective length of an object is the span of the distance of an object that is required to perform the function of the object. The effective length is lesser than or equal to the span of the distance of the object. For example, the effective length of a belt is the span of distance of the belt that is used to bind the belt to a prism shaped structure. The effective length of the belt can be less than the actual length of the belt.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Cord: As used in this disclosure, an elastic cord is a cord that contains elastic yarns as some of the yarns that make up the cord. An elastic cord is constructed such that the elastic cord will stretch when a force is applied and will return to its original shape when after the force is removed. Shock cord and bungee cord are synonyms for elastic cord.

Elastic Nature: As used in this disclosure, an elastic nature refers to a flexible structure that returns to its relaxed shape after the flexible structure has been deformed.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

External Power Source: As used in this disclosure, an external power source is a source of the energy that is externally provided to enable the operation of the present disclosure. Examples of external power sources include, but are not limited to, electrical power sources and compressed air sources.

Fastener: As used in this disclosure, a fastener is a device that is used to join or affix two objects. Fasteners generally comprise a first element which is attached to the first object and a second element which is attached to the second object such that the first element and the second element join to removably attach the first object and the second object. Common fasteners include, but are not limited to, hooks, zippers, magnets, snaps, buttons, buckles, quick release buckles, or hook and loop fasteners. A fastener is often referred to as a fastening device.

Fastening Device: As used in this disclosure, a fastening device is a device that is used to join or affix a first object to a second object.

Fitted: As used in this disclosure, the term fitted refers to two geometrically similar structures wherein the smaller geometrically similar structure inserts into the larger geometrically similar structure.

Fixed and Free End: As used in this disclosure, a fixed end refers to the lateral face of a disk shaped structure that is secured to an anchor point. A free end refers to the congruent end of the lateral face of a disk shaped structure that is distal from the fixed end. The free end of the disk shaped structure can be secured to a secondary structure that is independent of the anchor point.

Flexible: As used in this disclosure, flexible refers to an object or material that will deform when a force is applied 9 to it but that will not necessarily return to its original shape when the deforming force is removed.

Force of Gravity: As used in this disclosure, the force of gravity refers to a vector that indicates the direction of the pull of gravity on an object at or near the surface of the earth.

Friction: As used in this disclosure, friction refers to a force that occurs between two objects that are in relative motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Grommet: As used in this disclosure, a grommet is an eyelet placed in a hole in a textile, sheet, or panel that protects a rope hook or cable passed through it and to protect the textile, sheet, or panel from being torn. See bushing and flange.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground.

Hook: As used in this disclosure, a hook is an object that is curved or bent at an angle such that items can be hung on or caught by the object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image: As used in this disclosure, an image is an optical representation or reproduction of an indicia or of the appearance of something or someone. See indicia sentiment optical character recognition.

Indicia: As used in this disclosure, the term indicia refers to a set of markings that identify a sentiment.

Inelastic Nature: As used in this disclosure, an inelastic nature refers to a flexible structure that maintains its new shape after the flexible structure has been deformed.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

LED Rope: As used in this disclosure, an LED rope is a commercially available lighting device. The LED rope is uses LEDs to illuminate a space. The LED rope is a flexible cord structure. The illuminating LEDs are distributed along the span of the length of the cord. The LED rope mounts on a surface. The flexible nature of the LED rope allows the LED rope to bend around corners during installation. The LED rope draws power from the national electric grid. While there are minor technical differences, this definition is intended to include LED rope like products commonly marketed as LED strips.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed from posterior side towards the anterior side. The right side of any object is the same side as the right side of the human body when the object is viewed from posterior side towards the anterior side. The left and right sides of the object remain unchanged by changes to the direction from which the object is viewed.

Light: As used in this disclosure, a light is an electrical device that generates visible light to illuminate objects or an area.

Light String: As used in this disclosure, a light string is a commercially available lighting device. The light string illuminates a structure or a space. The light string comprises a cable and a plurality of illuminating elements. The plurality of illuminating elements are distributed along the span of the length of the cable. The cable forms the load path that transfers the load of the plurality of illuminating elements to a supporting structure. The flexible nature of the cable of the light string allows the light string to bend around corners during installation. The light string draws power from an external power source such as the national electric grid. The cable distributes the electric power to the illuminating elements of the light string. Examples of a light string include, but are not limited to, holiday lights and LED ropes.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load of an Object: As used in this disclosure, the term load of an object refers to an object that is inserted into a load path. The load of an object refers to the sum of the forces (including the force of gravity) that are applied to the object.

Load Path: As used in this disclosure, a load path refers to a chain of one or more structures that transfers a load generated by a raised structure or object to a foundation, supporting surface, or the earth.

Major and Minor Axes: As used in this disclosure, the major and minor axes refer to a pair of perpendicular axes that are defined within a structure. The length of the major axis is always greater than or equal to the length of the minor axis. The major axis forms the longest symmetric bifurcation of a structure selected from the group consisting of: a) the structure; or, b) the perimetrical boundary of the structure. The major and minor axes intersect at the center of the structure. The major axis is always parallel or perpendicular to an edge of a rectangular or rectilinear structure.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Pan: As used in this disclosure, a pan is a hollow containment structure. The pan has a shape selected from the group consisting of: a) a prism; and, b) a truncated pyramid. The pan has a single open face. The open face of the pan is often, but not always, the superior face of the pan. The open face is a surface selected from the group consisting of: a) a congruent end of the prism structure that forms the pan; b) a lateral face of the prism structure that forms the pan, c) the base face of the truncated pyramid structure; and, d) the truncated face of the truncated pyramid structure. A semi-enclosed pan refers to a pan wherein the closed end of prism structure of the pan and/or a portion of the lateral face of the pan is also open.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Plant: As used in this disclosure, a plant is a biological organism: 1) that is not capable of movement over significant distances; and 2) that uses photosynthesis to create nutrients. A stationary biological organism that is not capable of movement over significant distances but does not use photosynthesis is referred to as a parasitic plant. In the vernacular, the term plant will often include parasitic plants. The intention of this disclosure is to include parasitic plants in the definition of plant. As used in this disclosure, the term foliage refers to the leaves and branches of a plant. The structure of the plant where photosynthesis occurs is called the leaf. The trunk of a plant refers to the portion of a plant that forms the biological connections between the roots of the plant and the foliage of the plant. The roots of the plant refer to the biological subsystem of the plant that draws nutrients into the plant through the soil.

Posterior: As used in this disclosure, posterior is a term that is used to refer to the side of an object that is distal or in the opposite direction of the anterior side. When comparing two items, the posterior item is the item that is distal from the anterior of the object.

Primary Shape: As used in this disclosure, the primary shape refers to a description of the rough overall geometric shape of an object that is assembled from multiple components or surfaces. The term essential primary shape is used to indicate the exclusion of functional items that are attached to the structure of the primary shape.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Ratchet: As used in this disclosure, a ratchet is a device comprising a pawl or hinged catch that engages the sloping teeth of a wheel or bar permitting motion in one direction only.

Ratcheted Ring and Slider Arrangement: As used in this disclosure a ratcheted ring and slider arrangement is a ring and slider arrangement that is further formed with a ratcheted lever structure. The ratcheted lever structure is a mechanical structure that uses a lever and a ratchet to pull the webbing through the threading provided by the ring and slider arrangement. The lever of the ratcheted ring and slider arrangement provides a mechanical advantage for pulling the webbing through the threading of the ring and slider arrangement. The ratchet structure prevents the webbing from sliding in the reverse direction through the ring and slider arrangement. The ratchet structure ensures that the webbing maintains tension when the webbing is used to bind an object to an anchor structure.

Relaxed Shape: As used in this disclosure, a structure is considered to be in its relaxed state when no shear, strain, or torsional forces are being applied to the structure.

Rig: As used in this disclosure, to rig is a verb that describes the use of cords, chains, webbings, pulleys, anchoring equipment, and other hardware used to prepare a vehicle or vessel for travel. A rigging refers to the system that is formed by the cords, chains, webbings, pulleys, anchoring equipment, and other hardware. The pulley, anchoring equipment, and other hardware are used to control: a) the position and directions of the cords, chains, and webbings; b) the effective lengths of the cords, chains, and webbings; and, c) the tensions of the cords, chains, and webbings.

Ring and Slider Arrangement: As used in this disclosure, a ring and slider arrangement is an apparatus comprising a ring component and a slider component that is used to adjust the effective length of a webbing in an application. In the ring and slider arrangement, an end of the webbing is inserted through the slider component, looped through the ring component and then reverse threaded through the slider component for a second time. By adjusting the position of the slider component relative to the webbing, the effective length of the webbing can be adjusted. Ring and slider arrangements are well known and documented in the textile arts.

Roll: As used in this disclosure, a roll is a method of storing paper or other sheeting as a cylindrical structure such that creases are not formed within the paper or sheeting. To form the roll, the paper or other sheeting material is curved over itself around a center axis such that a spiral is formed when the roll is viewed from the end of the cylindrical structure.

Roughly: As used in this disclosure, roughly refers to a comparison between two objects. Roughly means that the difference between one or more parameters of the two compared objects are not significantly different.

Scroll: As used in this disclosure, a scroll is a sheeting that is stored as a roll.

Seam: As used in this disclosure, a seam is a joining of: 1) a first textile to a second textile; 2) a first sheeting to a second sheeting; or, 3) a first textile to a first sheeting. Potential methods to form seams include, but are not limited to, a sewn seam, a heat bonded seam, an ultrasonically bonded seam, a laser bonded seam, a radio frequency (RF) bonded seam, or a seam formed using an adhesive.

Sentiment: As used in this disclosure, a sentiment refers to a symbolic meaning or message that is communicated through the use of an object or an image, potentially including a text based image.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Stanchion: As used in this disclosure, a stanchion refers to a vertically oriented prism-shaped pole, post, or support.

Strap: As used in this disclosure a strap is a strip of leather, cloth, or other flexible material, often with a buckle, that is used to fasten, secure, carry, or hold onto something.

Strip: As used in this disclosure, the term describes a long and narrow object of uniform thickness that appears thin relative to the length of the object. Strips are often rectangular in shape. Strips often have a disk shape.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Suspend: As used in this disclosure, to suspend an object means to support an object such that the inferior end of the object does not form a significant portion of the load path of the object.

Textile: As used in this disclosure, a textile is a material that is woven, knitted, braided or felted. Synonyms in common usage for this definition include fabric and cloth. The two surfaces of the textile with the greatest surface area are called the faces of the textile.

Tight Fit: As used in this disclosure, a tight fit refers to the attachment of a first object into a second object such that there is not a lot of space between the first object and the second object. By not a lot of space is meant that friction occurs when the first object relative to the second object.

Tree: As used in this disclosure, a tree is a plant. The typical tree projects a roughly prism shaped structure out of the ground in a roughly vertically oriented direction with a single structure called a trunk. Once above the ground, the tree grows a plurality of branches. Each branch is a roughly prism shaped structure that is roughly horizontally oriented. Leaves grow on the branches of the tree.

U-Shaped Structure: As used in this disclosure, a U-shaped structure is a type of offset composite prism structure. The U-shaped structure is a three sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of length of the first arm roughly equals the span of length of the second arm. A non-Euclidean U-shaped structure refers to a U-shaped structure with a cross beam that is formed as a non-Euclidean prism. An illiterate U-shaped structure refers to a U-shaped structure wherein the span of the length of the first arm differs from the span of the length of the second arm by more than 10 percent. A guided U-shaped structure refers to a U-shaped structure that has: a) the first arc formed by the interior cant formed between the first arm and the crossbeam is greater than or equal to 100 degrees; b) a second arc formed by the interior cant formed between the second arm and the crossbeam is greater than or equal to 100 degrees; and, c) the first arc and the second arc are roughly equal.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Webbing: As used in this disclosure, a webbing is strong, close woven or knitted fabric that is used for straps or belting. As used in this disclosure, webbing is a fully formed material that is only cut to length for use. Webbing is not formed by cutting broader materials into strips. Webbings have tensile strength but are too flexible to provide compressive strength and are not suitable for use in pushing objects. The shape of a webbing is approximated by a rectangular disk shape. The two surfaces of a webbing with the greatest surface area are called the faces of the webbing.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A Christmas-themed decoration for use with a tree comprising a superior sheeting panel, an inferior sheeting panel, a fastening device, and a plurality of rigging structures;

wherein the superior sheeting panel attaches to the inferior sheeting panel;

wherein the fastening device attaches to the inferior sheeting panel;

wherein the plurality of rigging structures attach to the superior sheeting panel;

wherein the inferior sheeting panel presents indicia that are intended to generate a sentiment of a cylindrical shape of a candy cane when viewed;

wherein the superior sheeting panel presents indicia that are intended to generate a sentiment of a hook of a candy cane when viewed;

wherein the fastening device comprises a plurality of grommet structures, a plurality of elastic cords, and a plurality of hook structures;

wherein each selected elastic cord is deformed as the fastening device is configured to attach to the inferior sheeting panel to the trunk of the tree;

wherein each selected grommet structure form an anchor point the anchors its associated selected hook structure to the inferior sheeting panel;

wherein the plurality of rigging structures comprises a first rigging structure and a second rigging structure;

wherein the first rigging structure is configured to bind the superior sheeting panel to the trunk of the tree;

wherein the second rigging structure is configured to bind the superior sheeting panel to the trunk of the tree.

2. The Christmas-themed decoration for use with a tree according to claim 1 wherein the Christmas-themed decoration is a decorative structure;

wherein the Christmas-themed decoration is configured for use with a stanchion structure;

wherein the Christmas-themed decoration is configured to bind to a trunk of a tree;

wherein the Christmas-themed decoration is configured to display an image from the trunk that is visible from the environment.

3. The Christmas-themed decoration for use with a tree according to claim 2 wherein the fastening device secures the inferior sheeting panel to the trunk of the tree;

wherein the plurality of rigging structures attach the superior sheeting panel to the trunk of the tree.

4. The Christmas-themed decoration for use with a tree according to claim 3 wherein the inferior sheeting panel is a sheeting structure;

wherein the inferior sheeting panel forms the superior structure of the image displayed;

wherein the inferior sheeting panel is an illuminated structure;

wherein the inferior sheeting panel generates an illumination that is visible from the environment;

wherein a textile structure of the inferior sheeting panel allows the inferior sheeting panel to be rolled into a scroll structure for storage;

wherein the form factor of the inferior sheeting panel presents a rectangular shape.

5. The Christmas-themed decoration for use with a tree according to claim 4 wherein the superior sheeting panel is a sheeting structure;

wherein the superior sheeting panel is an illuminated structure;

wherein the superior sheeting panel generates an illumination that is visible from the environment;

wherein the superior sheeting panel forms a u-shaped structure;

wherein the form factor of the superior sheeting panel presents an illiterate u-shape;

wherein the superior sheeting panel permanently attaches to the inferior sheeting panel.

6. The Christmas-themed decoration for use with a tree according to claim 5 wherein the fastening device attaches the perimeter edges of the inferior sheeting panel that are parallel to the major axis of the inferior sheeting panel;

wherein the fastening device binds the inferior sheeting panel to the trunk of the tree with a tight fit.

7. The Christmas-themed decoration for use with a tree according to claim 6 wherein each rigging structure selected from the plurality of rigging structures is a mechanical structure;

wherein each selected rigging structure is a fastening device;

wherein each selected rigging structure attaches to the posterior face of the superior sheeting panel;

wherein each selected rigging structure binds the superior sheeting panel to the trunk of the tree with a tight fit.

8. The Christmas-themed decoration for use with a tree according to claim 7 wherein the inferior sheeting panel comprises an inferior image and an inferior light string structure;

wherein the inferior image is an image that is formed on the anterior face of the inferior sheeting panel;

wherein the inferior image forms the balance of the image displayed by the Christmas-themed decoration;

wherein the anterior face of the inferior sheeting panel is the face of the inferior sheeting panel that is configured to be distal from the trunk of the tree;

wherein the posterior face of the inferior sheeting panel is the face of the inferior sheeting panel that is distal from the inferior image;

wherein the posterior face of the inferior sheeting panel is configured to be proximal to the trunk of the tree;

wherein the inferior image presents indicia that are intended to generate the sentiment of the stripes traditionally displayed on a candy cane;

wherein the inferior light string structure is a light string;

wherein the inferior light string structure mounts on the anterior face of the inferior sheeting panel;

wherein the inferior light string structure is an electric device that converts electric energy into an illumination;

wherein the illumination generated by the inferior light string structure illuminates the inferior image such that the inferior image is visible from the environment during darkness.

9. The Christmas-themed decoration for use with a tree according to claim 8 wherein the superior sheeting panel comprises a first arm structure, a second arm structure, a superior image, and a superior light string structure;

wherein the first arm structure forms a portion of the u-shaped sheeting structure of the superior sheeting panel;

wherein the first arm structure forms a first arm of the u-shaped structure of the superior sheeting panel;

wherein the first arm structure attaches to the inferior sheeting panel;

wherein the span of the length of the first arm structure is greater than the span of the length of the second arm structure;

wherein the first arm structure presents indicia that are intended to generate the sentiment that the first arm structure is an extension of the cylinder of the candy cane;

wherein the second arm structure forms a portion of the u-shaped sheeting structure of the superior sheeting panel;

wherein the second arm structure forms a first arm of the u-shaped structure of the superior sheeting panel;

wherein the second arm structure presents indicia that are intended to generate the sentiment that the second arm structure that forms the capture end of the hook structure of the candy cane;

wherein the second arm structure forms the free end of the superior sheeting panel;

wherein the superior image is an image that is formed on the anterior face of the superior sheeting panel;

wherein the superior image forms a portion of the image displayed by the Christmas-themed decoration;

wherein the anterior face of the superior sheeting panel is the face of the superior sheeting panel that is configured to be distal from the trunk of the tree;

wherein the posterior face of the superior sheeting panel is the face of the superior sheeting panel that is distal from the superior image;

wherein the posterior face of the superior sheeting panel is configured to be proximal to the trunk of the tree;

wherein the superior image presents indicia that are intended to generate the sentiment of the stripes traditionally displayed on a candy cane;

wherein the superior light string structure is a light string;

wherein the superior light string structure mounts on the anterior face of the superior sheeting panel;

wherein the superior light string structure is an electric device that converts electric energy into an illumination;

wherein the illumination generated by the superior light string structure illuminates the superior image such that the superior image is visible from the environment during darkness;

wherein the superior light string structure draws electric energy from the inferior light string structure of the inferior sheeting panel.

10. The Christmas-themed decoration for use with a tree according to claim 9 wherein a seam joins the inferior sheeting panel to the free end of the first arm structure of the superior sheeting panel;

wherein the first arm structure attaches to a perimeter edge of the inferior sheeting panel that is parallel to the minor axis of the inferior sheeting panel;

wherein the first arm structure attaches to the perimeter edge of the inferior sheeting panel that positions the superior sheeting panel as the superior structure of the Christmas-themed decoration;

wherein the first arm structure attaches to the perimeter edge of the inferior sheeting panel such that the center of the first arm structure aligns with the major axis of the inferior sheeting panel.

11. The Christmas-themed decoration for use with a tree according to claim 10 wherein the plurality of grommet structures comprises a collection of grommet structures;

wherein the plurality of elastic cords comprises a collection of elastic cords;

wherein the plurality of hook structures comprises a collection of hook structures;

wherein there is a one to one correspondence between the plurality of hook structures and the plurality of grommet structures;

wherein there is a one to one correspondence between the plurality of hook structures and the plurality of elastic cords.

12. The Christmas-themed decoration for use with a tree according to claim 11 wherein each elastic cord selected from the plurality of elastic cords is an elastic cord;

wherein the fixed end of each elastic cord selected from the plurality of elastic cords attaches to a perimeter edge selected from the group consisting of: a) left side perimeter edge that is parallel to the major axis of the inferior sheeting panel; and, b) right side perimeter edge that is parallel to the major axis of the inferior sheeting panel;

wherein each selected elastic cord provides a portion of the tension is configured to secure the inferior sheeting panel to the trunk of the tree with a tight fit;

wherein each hook structure selected from the plurality of hook structures is a hook;

wherein each selected hook structure permanently attaches to the free end of its associated elastic cord selected from the plurality of elastic cords;

wherein each selected hook structure detachable secures the free end of the associated selected elastic cord to its associated grommet structure selected from the plurality of grommet structures;

wherein the selected elastic cord deformed as the selected hook structure secures its associated selected elastic cord to its associated selected grommet structure;

wherein the plurality of grommet structures are formed at the perimeter edge of the inferior sheeting panel that was not selected for the plurality of hook structures;

wherein each grommet structure selected from the plurality of grommet structures is a grommet.

13. The Christmas-themed decoration for use with a tree according to claim 12 wherein the first rigging structure is a rigging;

wherein the first rigging structure is a webbing based structure;

wherein the first rigging structure attaches to the posterior face of the superior sheeting panel;

wherein the second rigging structure is a rigging;

wherein the second rigging structure is a webbing based structure;

wherein the second rigging structure attaches to the posterior face of the superior sheeting panel.

14. A Christmas-themed decoration for use with a tree comprising a superior sheeting panel, an inferior sheeting panel, a fastening device, and a plurality of rigging structures;

wherein the superior sheeting panel attaches to the inferior sheeting panel;

wherein the fastening device attaches to the inferior sheeting panel;

wherein the plurality of rigging structures attach to the superior sheeting panel;

wherein the Christmas-themed decoration is a decorative structure;

wherein the Christmas-themed decoration is configured for use with a tree;

wherein the Christmas-themed decoration is configured to display an image from a trunk of the tree that is visible from the environment;

wherein the inferior sheeting panel presents indicia that are intended to generate a sentiment of a cylindrical shape of a candy cane when viewed;

wherein the superior sheeting panel presents indicia that are intended to generate a sentiment of a hook of a candy cane when viewed;

wherein the fastening device comprises a plurality of grommet structures, a plurality of elastic cords, and a plurality of hook structures;

wherein each selected elastic cord is deformed as the fastening device is configured to attach to the inferior sheeting panel to the trunk of the tree;

wherein each selected grommet structure form an anchor point the anchors its associated selected hook structure to the inferior sheeting panel;

wherein the plurality of rigging structures comprises a first rigging structure and a second rigging structure;

wherein the first rigging structure is configured to bind the superior sheeting panel to the trunk of the tree;

wherein the second rigging structure is configured to bind the superior sheeting panel to the trunk of the tree.

15. The Christmas-themed decoration for use with a tree according to claim 14 wherein the tree forms a stanchion structure to which the Christmas-themed decoration attaches;

wherein the fastening device secures the inferior sheeting panel to the trunk of the tree;

wherein the plurality of rigging structures attach the superior sheeting panel to the trunk of the tree;

wherein the inferior sheeting panel is a sheeting structure;

wherein the inferior sheeting panel is a textile based structure;

wherein the inferior sheeting panel forms the inferior structure of the image displayed by the Christmas-themed decoration;

wherein the inferior sheeting panel is an illuminated structure;

wherein the inferior sheeting panel generates an illumination that is visible from the environment;

wherein the textile structure of the inferior sheeting panel allows the inferior sheeting panel to be rolled into a scroll structure for storage;

wherein the form factor of the inferior sheeting panel presents a rectangular shape.

16. The Christmas-themed decoration for use with a tree according to claim 15 wherein the superior sheeting panel is a sheeting structure;

wherein the superior sheeting panel is a textile based structure;

wherein the superior sheeting panel forms the superior structure of the image displayed by the Christmas-themed decoration;

wherein the superior sheeting panel is an illuminated structure;

wherein the superior sheeting panel generates an illumination that is visible from the environment;

wherein the superior sheeting panel forms a u-shaped structure;

wherein the form factor of the superior sheeting panel presents an illiterate u-shape;

wherein the superior sheeting panel permanently attaches to the inferior sheeting panel;

wherein the fastening device attaches the perimeter edges of the inferior sheeting panel that are parallel to the major axis of the inferior sheeting panel;

wherein the fastening device is configured to bind the inferior sheeting panel to the trunk of the tree with a tight fit.

17. The Christmas-themed decoration for use with a tree according to claim 16 wherein each rigging structure selected from the plurality of rigging structures is a mechanical structure;

wherein each selected rigging structure is a fastening device;

wherein each selected rigging structure attaches to the posterior face of the inferior sheeting panel;

wherein each selected rigging structure is configured to bind the superior sheeting panel to the trunk of the tree;

wherein the inferior sheeting panel comprises an inferior image and an inferior light string structure;

wherein the inferior image is an image that is formed on the anterior face of the inferior sheeting panel;

wherein the inferior image forms the balance of the image displayed by the Christmas-themed decoration;

wherein the anterior face of the inferior sheeting panel is the face of the inferior sheeting panel that is configured to be distal from the trunk of the tree;

wherein the posterior face of the inferior sheeting panel is the face of the inferior sheeting panel that is distal from the inferior image;

wherein the posterior face of the inferior sheeting panel is configured to be proximal to the trunk of the tree;

wherein the inferior image presents indicia that are intended to generate the sentiment of the stripes traditionally displayed on a candy cane;

wherein the inferior light string structure is a light string;

wherein the inferior light string structure mounts on the anterior face of the superior sheeting panel;

wherein the inferior light string structure is an electric device that converts electric energy into an illumination;

wherein the illumination generated by the inferior light string structure illuminates the inferior image such that the inferior image is visible from the environment during darkness.

18. The Christmas-themed decoration for use with a tree according to claim 17 wherein the superior sheeting panel comprises a first arm structure, a second arm structure, a superior image, and a superior light string structure;

wherein the first arm structure forms a portion of the u-shaped sheeting structure of the superior sheeting panel;

wherein the first arm structure forms a first arm of the u-shaped structure of the superior sheeting panel;

wherein the first arm structure attaches to the inferior sheeting panel;

wherein the span of the length of the first arm structure is greater than the span of the length of the second arm structure;

wherein the first arm structure presents indicia that are intended to generate the sentiment that the first arm structure is an extension of the cylinder of the candy cane;

wherein the second arm structure forms a portion of the u-shaped sheeting structure of the superior sheeting panel;

wherein the second arm structure forms a first arm of the u-shaped structure of the superior sheeting panel;

wherein the second arm structure presents indicia that are intended to generate the sentiment that the second arm structure that forms the capture end of the hook structure of the candy cane;

wherein the second arm structure forms the free end of the superior sheeting panel;

wherein the superior image is an image that is formed on the anterior face of the superior sheeting panel;

wherein the superior image forms a portion of the image displayed by the Christmas-themed decoration;

wherein the anterior face of the superior sheeting panel is the face of the superior sheeting panel that is configured to be distal from the trunk of the tree;

wherein the posterior face of the superior sheeting panel is the face of the superior sheeting panel that is distal from the superior image;

wherein the posterior face of the superior sheeting panel is configured to be proximal to the trunk of the tree;

wherein the superior image presents indicia that are intended to generate the sentiment of the stripes traditionally displayed on a candy cane;

wherein the superior light string structure is a light string;

wherein the superior light string structure mounts on the anterior face of the superior sheeting panel;

wherein the superior light string structure is an electric device that converts electric energy into an illumination;

wherein the illumination generated by the superior light string structure illuminates the superior image such that the superior image is visible from the environment during darkness;

wherein the superior light string structure draws electric energy from the inferior light string structure of the inferior sheeting panel.

19. The Christmas-themed decoration for use with a tree according to claim 18 wherein a seam joins the inferior sheeting panel to the free end of the first arm structure of the superior sheeting panel;

wherein the first arm structure attaches to a perimeter edge of the inferior sheeting panel that is parallel to the minor axis of the inferior sheeting panel;

wherein the first arm structure attaches to the perimeter edge of the inferior sheeting panel that positions the superior sheeting panel as the superior structure of the Christmas-themed decoration;

wherein the first arm structure attaches to the perimeter edge of the inferior sheeting panel such that the center of the first arm structure aligns with the major axis of the inferior sheeting panel;

wherein the plurality of grommet structures comprises a collection of grommet structures;

wherein the plurality of elastic cords comprises a collection of elastic cords;

wherein the plurality of hook structures comprises a collection of hook structures;

wherein there is a one to one correspondence between the plurality of hook structures and the plurality of grommet structures;

wherein there is a one to one correspondence between the plurality of hook structures and the plurality of elastic cords.

20. The Christmas-themed decoration for use with a tree according to claim 19 wherein each elastic cord selected from the plurality of elastic cords is an elastic cord;

wherein the fixed end of each elastic cord selected from the plurality of elastic cords attaches to a perimeter edge selected from the group consisting of: a) left side perimeter edge that is parallel to the major axis of the inferior sheeting panel; and, b) right side perimeter edge that is parallel to the major axis of the inferior sheeting panel;

wherein each selected elastic cord provides a portion of the tension that is configured to secure the inferior sheeting panel to the trunk of the tree;

wherein each hook structure selected from the plurality of hook structures is a hook;

wherein each selected hook structure permanently attaches to the free end of its associated elastic cord selected from the plurality of elastic cords;

wherein each selected hook structure detachable secures the free end of the associated selected elastic cord to its associated grommet structure selected from the plurality of grommet structures;

wherein the selected elastic cord deformed as the selected hook structure secures its associated selected elastic cord to its associated selected grommet structure;

wherein the plurality of grommet structures are formed at the perimeter edge of the inferior sheeting panel that was not selected for the plurality of hook structures;

wherein each grommet structure selected from the plurality of grommet structures is a grommet;

wherein the first rigging structure is a rigging;

wherein the first rigging structure is a webbing based structure;

wherein the first rigging structure attaches to the posterior face of the superior sheeting panel;

wherein the second rigging structure is a rigging;

wherein the second rigging structure is a webbing based structure;

wherein the second rigging structure attaches to the posterior face of the superior sheeting panel.

* * * * *